(12) United States Patent
Capito (10) Patent No.: US 8,197,386 B2
(45) Date of Patent: Jun. 12, 2012

(54) ELECTROHYDRAULIC TORQUE TRANSFER DEVICE AND TEMPERATURE CONTROL SYSTEM

(75) Inventor: Russell T. Capito, Clarkston, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 1091 days.

(21) Appl. No.: 12/104,478

(22) Filed: Apr. 17, 2008

(65) Prior Publication Data

US 2008/0196962 A1    Aug. 21, 2008

Related U.S. Application Data

(63) Continuation-in-part of application No. 11/201,468, filed on Aug. 11, 2005, now Pat. No. 7,445,106.

(51) Int. Cl.
*B60W 10/00* (2006.01)
(52) U.S. Cl. .......................................................... 477/70
(58) Field of Classification Search .................. 477/76, 477/98, 174, 101, 102, 97
See application file for complete search history.

(56) References Cited

U.S. PATENT DOCUMENTS

| | | | |
|---|---|---|---|
| 3,546,969 A | 12/1970 | Gibson et al. | |
| 4,403,527 A * | 9/1983 | Mohl et al. | 477/32 |
| 4,862,769 A | 9/1989 | Koga et al. | |
| 4,909,371 A | 3/1990 | Okamoto et al. | |
| 4,923,029 A | 5/1990 | Lanzer | |
| 5,072,630 A * | 12/1991 | Kikuchi et al. | 477/98 |
| 5,148,903 A | 9/1992 | Kobayashi et al. | |
| 5,224,906 A | 7/1993 | Sturm | |
| 5,680,917 A | 10/1997 | Bray | |
| 5,799,260 A * | 8/1998 | Droste et al. | 701/51 |
| 5,811,948 A | 9/1998 | Sato et al. | |
| 5,960,922 A | 10/1999 | Riess et al. | |
| 6,315,097 B1 | 11/2001 | Burns | |
| 6,398,686 B1 | 6/2002 | Irwin | |
| 6,461,267 B1 | 10/2002 | Paielli | |
| 6,581,741 B2 | 6/2003 | Taureg | |
| 6,595,086 B2 | 7/2003 | Kobayashi | |
| 6,672,420 B2 | 1/2004 | Porter | |
| 6,681,912 B2 * | 1/2004 | Suzuki et al. | 192/85.41 |

(Continued)

FOREIGN PATENT DOCUMENTS

DE   102006037838 A1   3/2007

(Continued)

OTHER PUBLICATIONS

Written Opinion for International Application No. PCT/US2009/041926, dated Dec. 16, 2009, 4 pgs.

(Continued)

*Primary Examiner* — David D Le
*Assistant Examiner* — David J Hlavka
(74) *Attorney, Agent, or Firm* — Harness, Dickey & Pierce, P.L.C.

(57) ABSTRACT

A power transmission device includes a friction clutch operable to selectively transfer torque between an input member and an output member. An actuator is operable to provide an actuating force to the friction clutch. The actuator includes an electric motor having an output shaft drivingly coupled to a pump. The pump is operable to provide pressurized fluid to a piston acting on the friction clutch. A controller that is switched on and off in response to an ignition signal estimates the temperature of the friction clutch at the time of being switched on based on a time the controller has been off. A method of estimating a temperature of the friction clutch is also disclosed.

18 Claims, 7 Drawing Sheets

U.S. PATENT DOCUMENTS

| | | | |
|---|---|---|---|
| 6,681,913 B2 | 1/2004 | Lee | |
| 6,725,989 B1 | 4/2004 | Krisher et al. | |
| 6,745,879 B1 | 6/2004 | Dolan | |
| 6,817,434 B1 | 11/2004 | Sweet | |
| 6,848,555 B2 | 2/2005 | Sakata et al. | |
| 6,916,270 B2 * | 7/2005 | Genise | 477/102 |
| 6,945,374 B2 * | 9/2005 | Puiu | 192/35 |
| 7,210,566 B2 | 5/2007 | Baxter, Jr | |
| 7,296,669 B2 | 11/2007 | Quehenberger et al. | |
| 7,369,930 B2 | 5/2008 | Hsieh et al. | |
| 7,445,106 B2 | 11/2008 | Capito | |
| 7,743,899 B2 | 6/2010 | Capito | |
| 2001/0022507 A1 | 9/2001 | Marinus et al. | |
| 2002/0162722 A1 | 11/2002 | Suzuki et al. | |
| 2003/0230461 A1 | 12/2003 | Sakata et al. | |
| 2004/0129475 A1 | 7/2004 | Forsyth et al. | |
| 2004/0251070 A1 | 12/2004 | Sakata et al. | |
| 2005/0167224 A1 | 8/2005 | Puiu | |
| 2006/0000685 A1 | 1/2006 | Puiu | |
| 2007/0175721 A1 | 8/2007 | Nett et al. | |
| 2007/0215428 A1 | 9/2007 | Capito | |
| 2008/0064569 A1 | 3/2008 | Baxter et al. | |

FOREIGN PATENT DOCUMENTS

| | | |
|---|---|---|
| EP | 0278588 A1 | 8/1988 |
| JP | 58 091927 | 6/1983 |
| JP | 9071142 A | 3/1997 |
| JP | 09 112592 | 5/1997 |
| JP | 2002326522 A | 11/2002 |
| KR | 10-1989-0000272 | 3/1989 |
| WO | 02079661 A1 | 10/2002 |
| WO | WO 02/079664 | 10/2002 |
| WO | 2005009774 A1 | 2/2005 |

OTHER PUBLICATIONS

International Search Report for International Application No. PCT/US2009/040606 dated Nov. 25, 2009, 3 pgs.
Written Opinion for International Application No. PCT/US2009/040606 dated Nov. 25, 2009, 4 pgs.
Supplementary European Search Report dated Jun. 25, 2010 for EP Application No. 08755080, 4 pgs.
Supplementary European Search Report dated Sep. 1, 2009 for EP Application No. 06813354, 4 pgs.
European Office Action dated Jun. 29, 2010 for EP Application No. 06813354.5, 4 pgs.
International Search Report for International Application No. PCT/US06/31070 dated Apr. 17, 2008, 3 pgs.
Written Opinion for International Application No. PCT/US06/31070 dated Apr. 17, 2008, 3 pgs.
International Search Report for International Application No. PCT/US2008/062744 dated Oct. 20, 2008, 3 pgs.
Written Opinion for International Application No. PCT/US2008/062744 dated Oct. 20, 2008, 4 pgs.
International Search Report for International Application No. PCT/US2009/041926, dated Dec. 16, 2009.

* cited by examiner

ELECTROHYDRAULIC TORQUE TRANSFER DEVICE AND TEMPERATURE CONTROL SYSTEM

CROSS-REFERENCE TO RELATED APPLICATIONS

This application is a continuation-in-part of U.S. patent application Ser. No. 11/201,468 filed on Aug. 11, 2005. The disclosure of the above application is incorporated herein by reference.

BACKGROUND AND SUMMARY

The present disclosure relates generally to a power transmission device operable to selectively transfer torque between first and second sets of drivable wheels of a vehicle. More particularly, the present disclosure is directed to a power transmission device adapted for use in motor vehicle driveline applications having an actuator including an electric motor drivably coupled to a gerotor for providing pressurized fluid to a piston acting on a friction clutch.

Due to increased demand for four-wheel drive vehicles, many power transmission systems are typically being incorporated into vehicle driveline applications for transferring drive torque to the wheels. Many vehicles include a power transmission device operably installed between the primary and secondary drivelines. Such power transmission devices are typically equipped with a torque transfer mechanism for selectively transferring drive torque from the primary driveline to the secondary driveline to establish a four-wheel drive mode of operation. At least one known torque transfer mechanism includes a dog-type lock-up clutch that may be selectively engaged for rigidly coupling the secondary driveline to the primary driveline when the vehicle is operated in four-wheel drive mode. Drive torque is delivered only to the primary driveline when the lock-up clutch is released and the vehicle operates in a two-wheel drive mode.

Another type of power transmission device is operable for automatically directing drive torque to the secondary wheels without any input or action on the part of a vehicle operator. When traction is lost at the primary wheels, four-wheel drive mode is engaged. Some transfer cases are equipped with an electrically-controlled clutch actuator operable to regulate the amount of drive torque transferred to a secondary output shaft as a function of changes in vehicle operating characteristics such as vehicle speed, throttle position and steering angle. Typically in the power transfer device is a clutch positioned within the transfer case housing. This device could also be added to a driven axle as a limited slip differential.

While many power transfer devices are currently used in four-wheel drive vehicles, a need exists to advance the technology and recognize the system limitations. For example, the size, weight and packaging requirements of the power transmission device may make such systems cost prohibitive in some four-wheel drive applications.

The present disclosure provides a power transmission device including a friction clutch operable to selectively transfer torque between an input member and an output member. An actuator is operable to provide an actuating force to the friction clutch. The actuator includes an electric motor having an output shaft drivingly coupled to a gerotor. The gerotor is operable to provide pressurized fluid to a piston acting on the friction clutch. The gerotor substantially deadheads during actuation of the friction clutch.

The power transmission device may include a controller operable to determine a magnitude of torque to be transferred. The controller controls the actuator to pressurize fluid within a closed cavity containing a piston acting on a friction clutch to generate the requested magnitude of torque. The controller is operable to vary the supply of electrical energy to the motor via pulse width modulation to vary the output of a positive displacement pump and vary the output torque of the friction clutch. The motor is operable to continuously rotate while torque is being transferred by the friction clutch.

Furthermore, the controller may be switched on and off in response to an ignition signal controlling the vehicle engine. The controller estimates the temperature of the friction clutch at the time of being switched on based on a time that the controller has been off.

A method of estimating a temperature of a torque transferring coupling in a vehicle is also disclosed. The method includes storing an engine coolant temperature at ignition shut-off. The engine coolant temperature is also determined at ignition initialization. A time is estimated that the ignition was off based on a differential between the engine coolant temperature at ignition initialization and the engine coolant temperature at the previous ignition shut-off. A decrease in temperature of the torque transferring coupling is calculated based on a temperature of the torque transferring coupling at the previous ignition shut-off, an ambient temperature and the estimated time that the ignition has been off.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the disclosure, its application, or uses.

The present disclosure is directed to a power transmission device that may be adaptively controlled for modulating the torque transferred between a rotatable input member and a rotatable output member. The torque transfer mechanism may be useful within motor vehicle drivelines as a stand-alone device that may be easily incorporated between sections of propeller shafts, directly coupled to a driving axle assembly, or other in-line torque coupling applications. Accordingly, while the present disclosure is hereinafter described in association with a specific structural embodiment for use in a driveline application, it should be understood that the arrangement shown and described is merely intended to illustrate an exemplary embodiment of the present disclosure.

Figure 1:
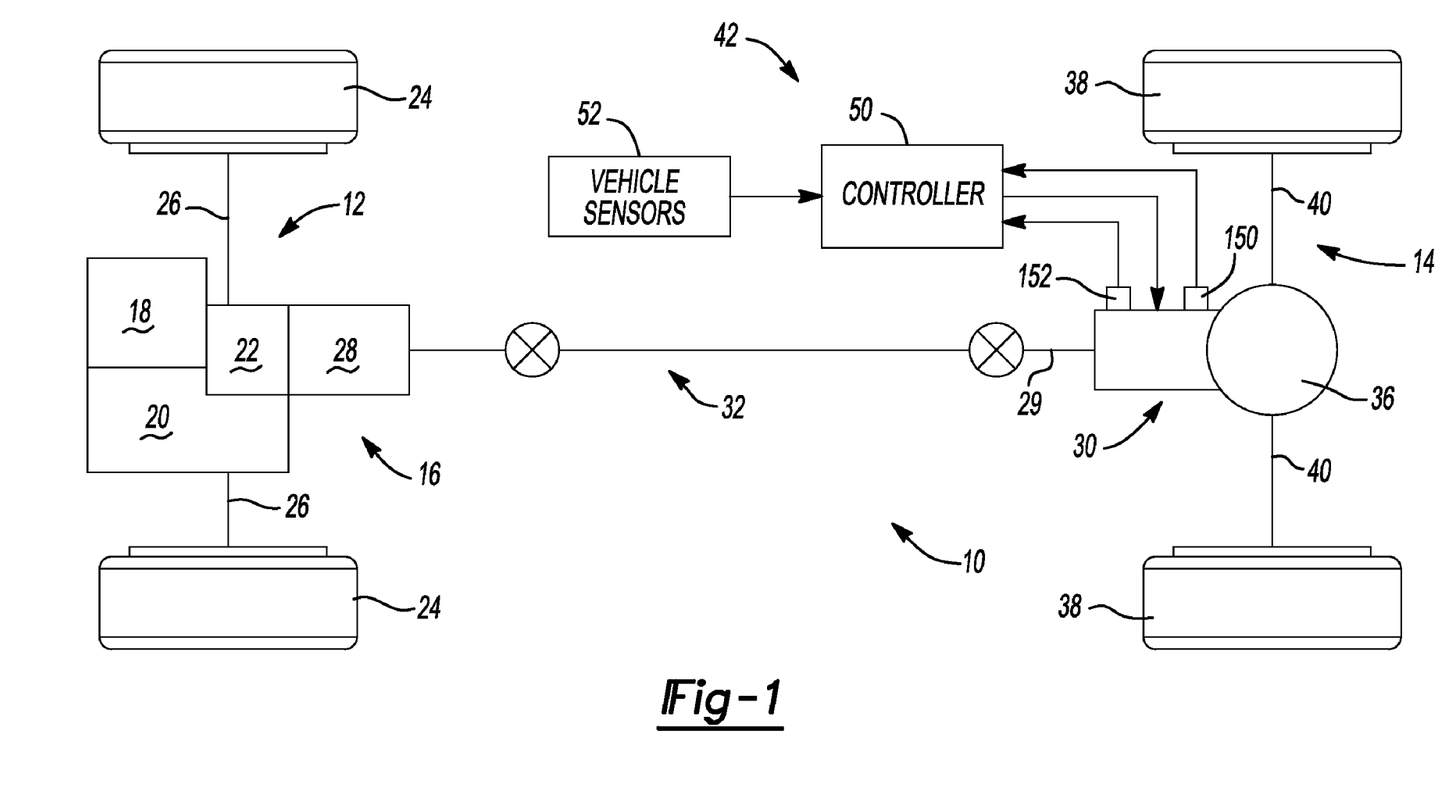
FIG. 1 is a schematic of a four-wheel drive vehicle equipped with a power transmission device of the present disclosure.

With reference to FIG. 1 of the drawings, a drive train 10 for a four-wheel vehicle is shown. Drive train 10 includes a first axle assembly 12, a second axle assembly 14 and a power transmission 16 for delivering drive torque to the axle assemblies. In the particular arrangement shown, first axle 12 is the front driveline while second axle 14 is the rear driveline. Power transmission 16 includes an engine 18 and a multi-speed transmission 20 having an integrated front differential unit 22 for driving front wheels 24 via axle shafts 26. A transfer unit 28 is also driven by transmission 20 for delivering torque to an input member 29 of a coupling 30 via a driveshaft 32. The input member 29 of the coupling 30 is coupled to driveshaft 32 while its output member is coupled to a drive component of a rear differential 36. Second axle assembly 14 also includes a pair of rear wheels 38 connected to rear differential 36 via rear axle shafts 40.

Drive train 10 is shown to include an electronically-controlled power transfer system 42 including coupling 30. Power transfer system 42 is operable to selectively provide drive torque in a two-wheel drive mode or a four-wheel drive mode. In the two-wheel drive mode, torque is not transferred via coupling 30. Accordingly, 100% of the drive torque delivered by transmission 20 is provided to front wheels 24. In the four-wheel drive mode, power is transferred through coupling 30 to supply torque to rear wheels 38. The power transfer system 42 further includes a controller 50 in communication with vehicle sensors 52 for detecting dynamic and operational characteristics of the motor vehicle. The controller is operable to control actuation of coupling 30 in response to signals from vehicle sensors 52. The controller 50 may be programmed with a predetermined target torque split between the first and second sets of wheels. Alternatively, the controller may function to determine the desired torque to be transferred through coupling 30 via other methods. Regardless of the method used for determining the magnitude of torque to transfer, controller 50 operates coupling 30 to maintain the desired torque magnitude.

Figure 2:
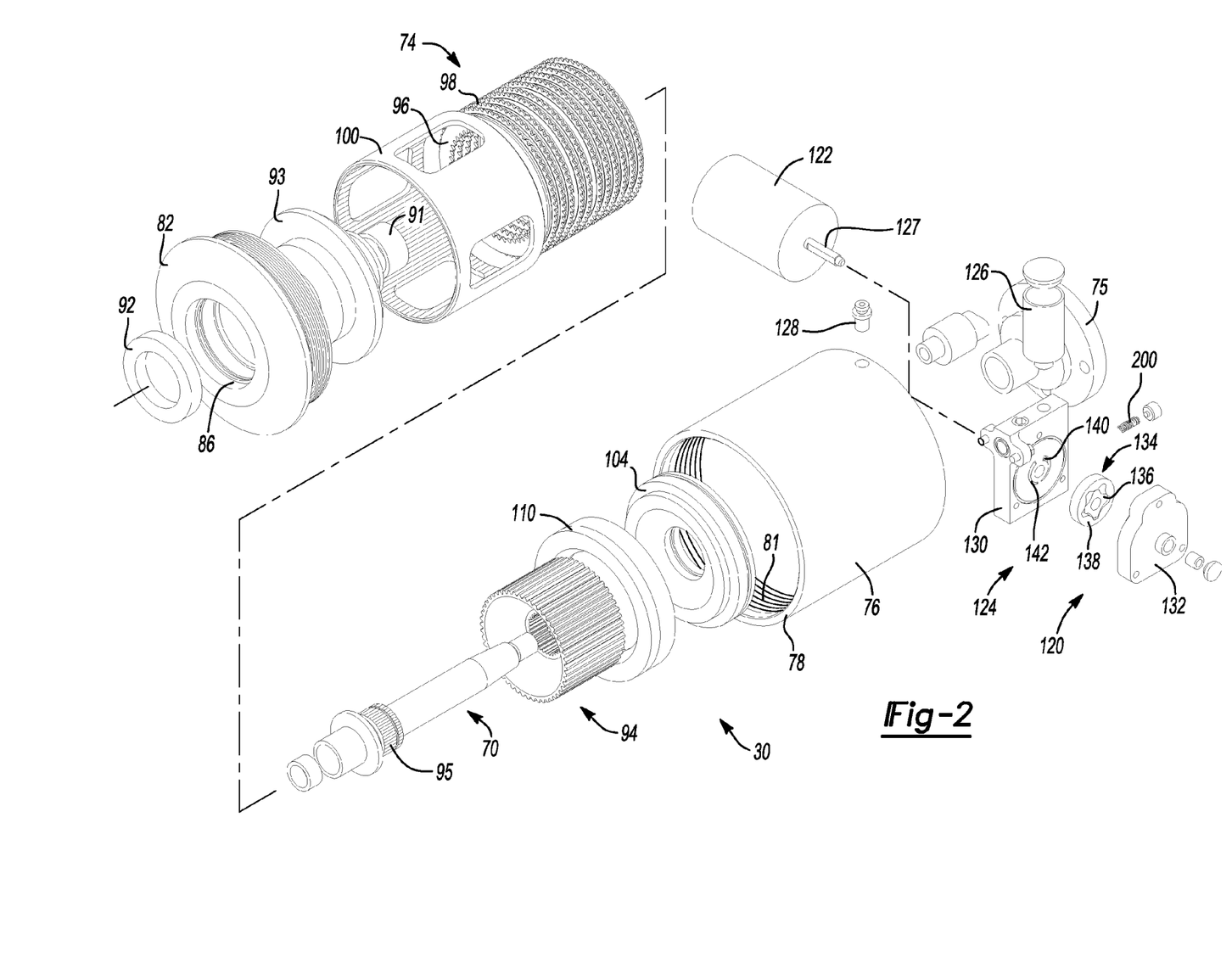
FIG. 2 is an exploded perspective view of an exemplary power transmission device.
Figure 3:
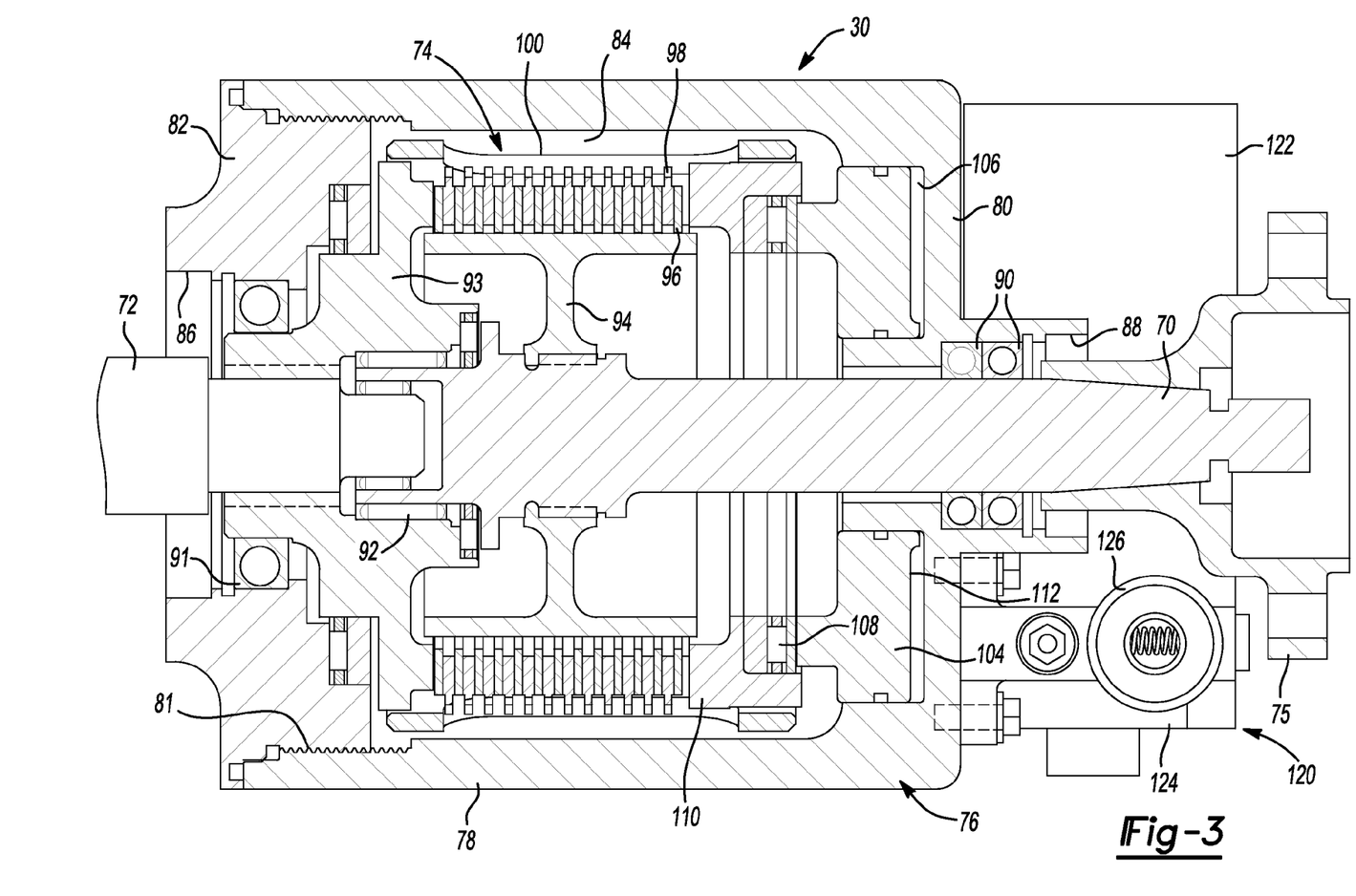
FIG. 3 is a cross-sectional side view of the power transmission device of FIG. 2.
Figure 4:
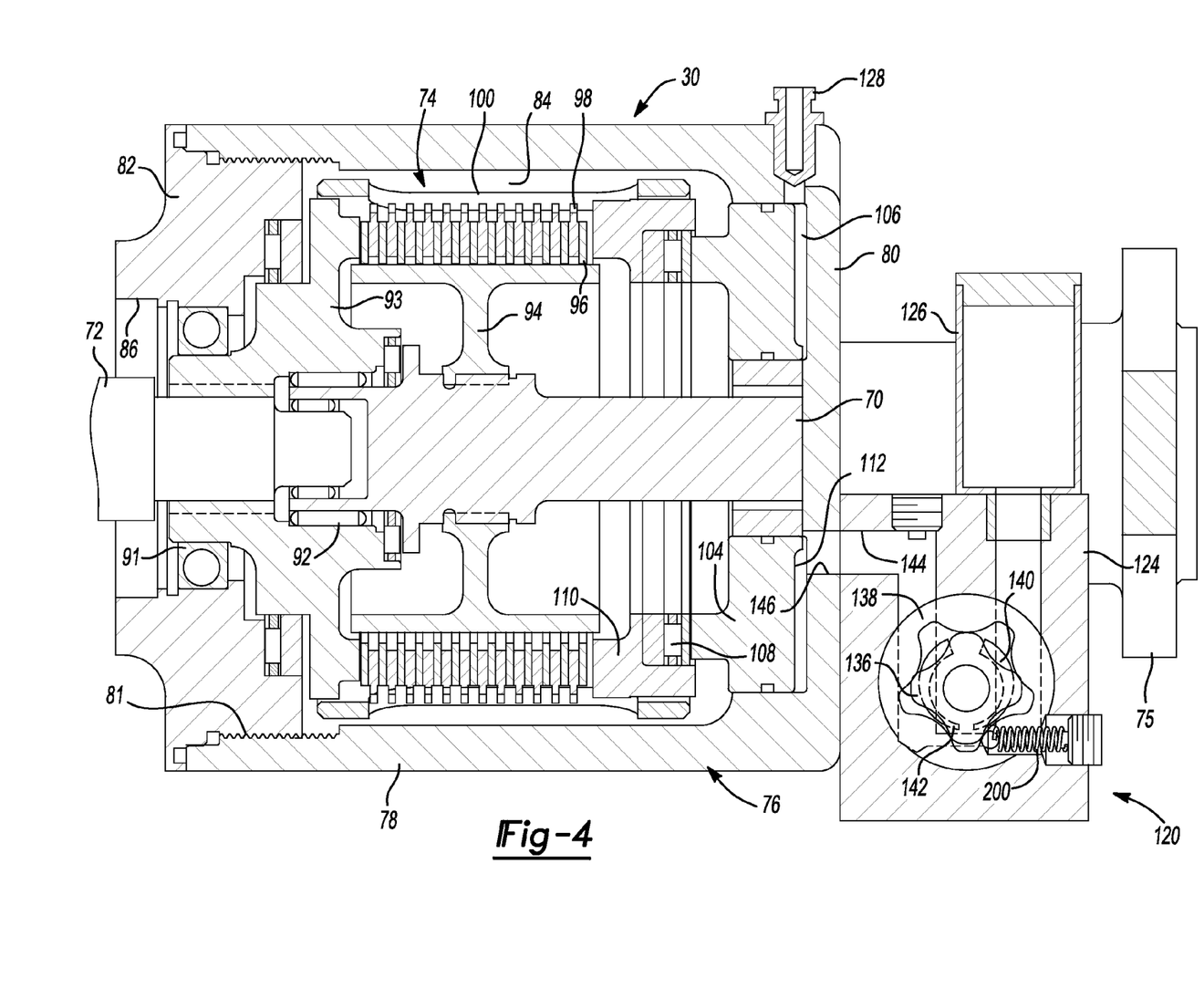
FIG. 4 is another cross-sectional side view of the power transmission device of FIG. 2.

FIGS. 2-4 depict coupling 30 in greater detail. Coupling 30 includes an input shaft 70 selectively drivingly coupled to an output shaft 72 via a friction clutch 74. A drive flange 75 is mounted on one end of input shaft 70 to provide a mounting provision for a driveline component such as driveshaft 32.

Coupling 30 includes a substantially cup-shaped housing 76 having a substantially cylindrically-shaped side wall 78 and an end wall 80. Side wall 78 includes an internally threaded portion 81 near the open end of housing 76. An end cap 82 is threadably engaged with threaded portion 81 to define a cavity 84. End cap 82 includes an aperture 86 extending therethrough. A portion of output shaft 72 extends through aperture 86. Housing 76 includes an aperture 88 extending through end wall 80. A portion of input shaft 70 extends through aperture 88. Bearings 90 are positioned within aperture 88 to rotatably support input shaft 70. Bearings 91 and 92 rotatably support an output spindle 93. Input shaft 70 includes a splined portion 95 (FIG. 2) drivingly coupled to a hub 94. A set of inner friction plates 96 are drivingly coupled to hub 94 via a splined engagement. Inner friction plates 96 are interleaved with a plurality of outer friction plates 98. Outer friction plates 98 are in splined engagement with a drum 100. Drum 100 is drivingly coupled to output spindle 93. Output spindle 93 is coupled with output shaft 72 via another splined interface. In the embodiment depicted, friction clutch 74 is a wet clutch. Accordingly, clutch fluid is contained within cavity 84 in communication with friction plates 96 and 98.

A piston 104 is slidably positioned within a cavity 106 formed within housing 76. Piston 104 is axially moveable into engagement with a thrust bearing 108 and an apply plate 110. When pressurized fluid acts on a face 112 of piston 104, piston 104 translates and applies a force through thrust bearing 108 and apply plate 110 to the plurality of interleaved clutch plates 96 and 98. Torque is transferred between input shaft 70 and output shaft 72 via the components previously described when friction plates 96 and 98 are forced into contact with one another.

An actuator 120 is mounted to housing 76 to selectively supply pressurized fluid to cavity 106 and provide an apply force to friction clutch 74. Actuator 120 includes an electric motor 122, a pump 124, and a reservoir 126. Electric motor 122 includes an output shaft 127 drivingly engaged with pump 124 such that rotation of the output shaft of the electric motor causes fluid within reservoir 126 to be pressurized and enter cavity 106. A bleed screw 128 is coupled to housing 76 in communication with cavity 106. Bleed screw 128 functions to allow an operator to purge trapped air from the closed hydraulic system. This minimizes the power required to compress trapped air.

Pump 124 includes a housing having a first half 130, a second half 132 and a gerotor 134. Gerotor 134 includes an inner gear 136 and an outer rotor 138 in engagement with one another. Inner gear 136 is drivingly coupled to the output shaft of electric motor 122. In operation, low pressure fluid passes through an inlet port 140 formed in housing half 130. Inlet port 140 is in fluid communication with reservoir 126. Rotation of inner gear 136 relative to outer rotor 138 causes a pumping action to force highly pressurized fluid through an outlet port 142 formed in housing half 130. Outlet port 142 is in fluid communication with a passageway 144 formed in pump housing half 130. Passageway 144 is positioned in fluid communication with an aperture 146 formed in housing 76. In this manner, fluid output from gerotor 134 is supplied to cavity 106 to act on piston 104.

One skilled in the art should appreciate that gerotor 134 acts on a closed volume of fluid located within passageway 144 and cavity 106. Because gerotor acts on the closed volume of fluid, electric motor 122 rotates at a relatively high rpm for only a relatively short amount of time when the clearance between piston 104, thrust bearing 108, apply plate 110 and the interleaved friction plates 96 and 98 is eliminated. After the clearance has been taken up, piston 104 transfers force to apply plate 110 to cause friction clutch 74 to generate torque. At this time, piston 104 does not axially move and gerotor 134 enters a near dead-head mode. Due to the existence of a clearance between inner gear 136 and outer rotor 138 of gerotor 134, as well as a clearance between gerotor 134 and the pump housing, the output shaft of electric motor 122 continues to rotate inner gear 136 to maintain a desired pressure acting on piston 104. It should be appreciated that the motor speed may depend on variables such as the type of fluid pumped, fluid temperature and the duty cycle of motor 122.

During motor and pump operation, some of the fluid trapped within passageway 144 and cavity 106 passes by inner gear 136 and outer rotor 138 in the reverse direction thereby allowing the output shaft of the electric motor to continue to rotate. If the gerotor were completely sealed and did not allow any backflow or blow by, the electric motor would be forced to stop due to the incompressible nature of the fluid being pumped by gerotor 134. In similar fashion, bleed screw 128 may be replaced with a small orifice connected to a passage back to the reservoir to define a self-bleeding system.

Figure 5:
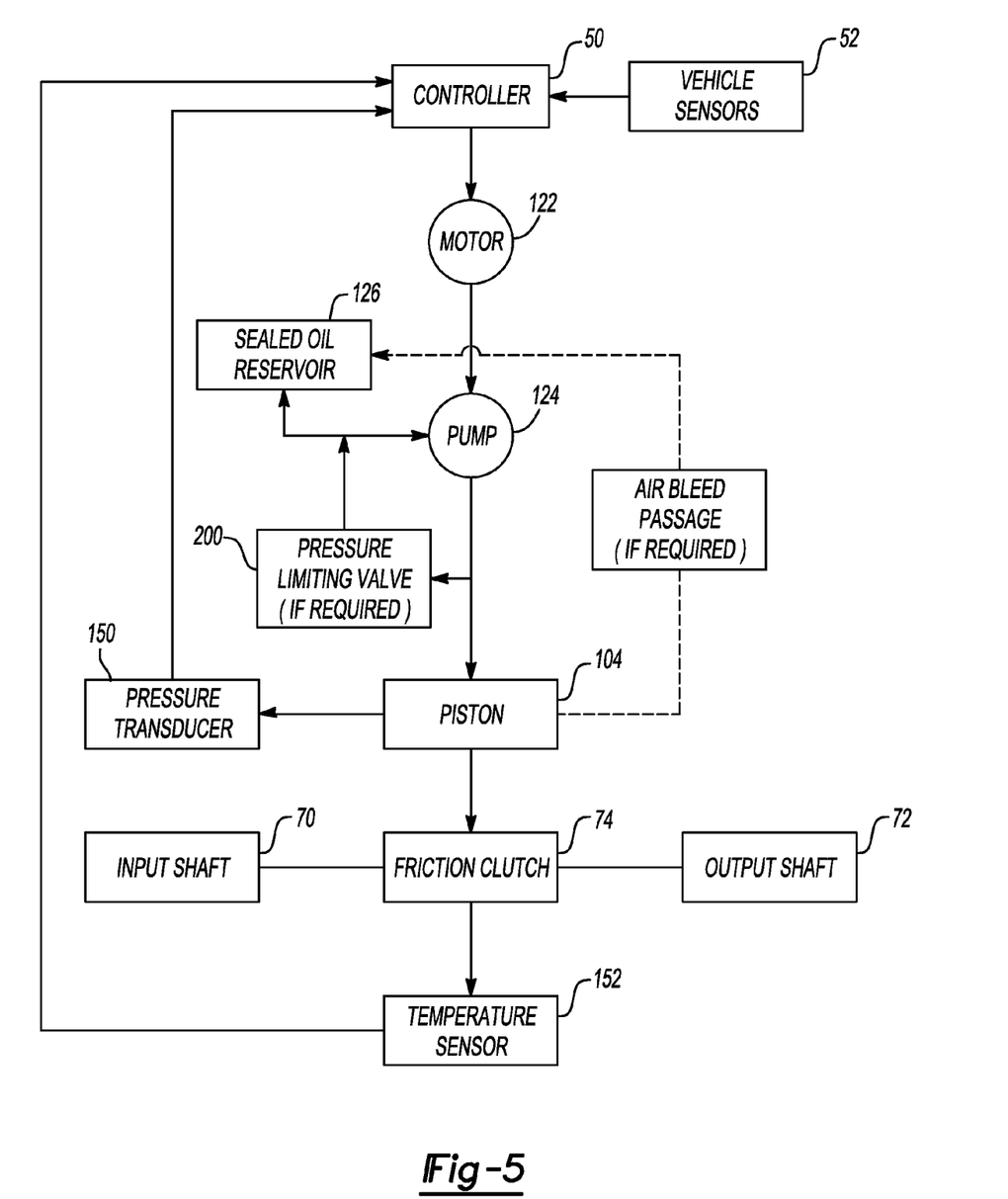
FIG. 5 is a schematic depicting the components of a torque transfer system including the power transmission device of the present disclosure.

As shown in FIG. 5, controller 50 is in communication with electric motor 122 as well as a pressure transducer 150. Pressure transducer 150 is operable to output a signal indicative of the fluid pressure within cavity 106. Controller 50 operates using a closed-loop feedback control to actuate electric motor 122 to maintain a target pressure acting on piston 104. Controller 50 is operable to provide a pulse width modulated signal to electric motor 122 to vary the output speed of the motor and the output pressure generated by pump 124. The pressure within cavity 106 should be proportional to the magnitude of torque output by friction clutch 74. By controlling the pressure maintained within cavity 106, the torque transferred through coupling 30 is controlled. Furthermore, a temperature sensor 152 is coupled to coupling 30 and is operable to provide controller 50 a signal indicative of the temperature of the clutch fluid contained within cavity 84. The controller 50 is programmed to vary the coupling control strategy based on clutch plate temperature. The control strategy attempts to protect the clutch fluid from overheating.

In an alternate embodiment, a pressure relief valve 200 (FIGS. 4 and 5) is plumbed in communication with the high pressure passageway 144. Pressure relief valve 200 is operable to allow pressurized fluid to pass from the high pressure side of pump 124 to the low pressure side at reservoir 126. Pressure relief valve 200 provides a path for the fluid within the previously described closed volume to escape. When pressure relief valve 200 allows flow therethrough, electric motor 122 may be operated at a higher rotational speed than previously described in the near dead-head operational mode of the pump. Depending on the type of electric motor fitted to coupling 30, it may be more or less desirable to incorporate pressure relief valve 200 into coupling 30. Specifically, if the electric motor may be operated for extended duration, it may not be necessary to include a pressure relief valve. On the contrary, if an electric motor design is chosen that must operate at higher rotational speeds, it may be desirable to include the pressure relief valve in order to provide a flow path for the fluid. It should also be appreciated that any number of gear arrangements may be inserted between the output shaft of electric motor 122 and the inner gear 136 of gerotor 134 thereby allowing the motor to operate a higher rotational speed while rotating the pump components at a low rotational speed. If a speed reducing gearset is used, a pressure relief valve is not necessarily required.

As previously mentioned, it may be beneficial to implement a coupling control strategy based on an operating temperature of coupling 30. Coupling 30 will also be referred to as a torque transfer device or TTD. The control strategy may be useful to prevent or protect coupling 30 from thermal damage that may occur by exceeding certain component target operating temperatures.

While a temperature sensor 152 was previously introduced to output a signal indicative of the temperature of the clutch fluid contained within cavity 84, an alternate control strategy includes defining a temperature model for use in lieu of temperature sensor 152 to reduce the cost of coupling 30. The temperature model may be a program or code within controller 50 that continuously calculates the temperature of coupling 30 by modeling the quantity of heat generated and the quantity of heat lost by coupling 30, based on operating conditions. Challenges may arise using a temperature model located within controller 50 because the continuous temperature calculation may cease when controller 50 is shut off such as when the vehicle ignition is turned off.

When controller 50 is re-initialized at vehicle ignition, the most recently stored temperature within controller 50 may be inaccurate depending on the temperature of coupling 30 at the time of shut down and whether the temperature model begins with the last stored temperature value within controller 50 or begins at a value indicative of the ambient temperature at the time of vehicle ignition. If an error in the current temperature estimate of coupling 30 occurs, controller 50 may be falsely signaled that coupling 30 is exceeding its desired operating temperature and thermal protection may be initiated too soon. On the other hand, coupling 30 may be damaged if the actual temperature of the coupling exceeds the estimate within the temperature model.

A first method for improving the accuracy of the temperature model includes accounting for the time that the coupling 30 has had to change temperature while the vehicle was shut off. The time that the coupling 30 has had to cool may be estimated by evaluating the engine coolant temperature at the time of vehicle shutdown and the engine coolant temperature at the time of vehicle start up.

The first temperature estimation method begins with an assumption that a lumped thermal capacity model is valid to describe the rate of cooling of an internal combustion engine. Based on this assumption, the temperature model uses measured engine coolant temperature as an input. Because the vehicle engine operates at an elevated temperature and has a larger mass than the coupling 30, it will be further assumed that the engine will cool at a slower or similar rate as coupling 30.

To implement the lumped thermal capacity model, a time constant for the engine is established. Determining the engine time constant includes operating the engine at an elevated steady state temperature and subsequently discontinuing engine operation. The time required for the engine temperature to reduce to 36.8% of the original temperature differential between the engine steady state temperature and the ambient environment temperature is determined. The lumped thermal capacity equation is as follows:

$$tc\_engine = (-1*t)/[\ln((T-Te)/(To-Te)]$$

where
$tc\_engine$ = Engine time constant
$t$ = Elapsed time to reach 36.8% of initial temperature difference
$T$ = Temperature equaling 36.8% of initial temperature difference
$Te$ = Ambient air temperature
$To$ = Initial engine temperature at time of ignition shut off To simplify the temperature model, the engine time constant need be calculated only once. The constant is permanently stored in the memory of controller 50. However, the engine time constant may vary based on environmental conditions. For example, wind velocity may affect the engine time constant. To obtain an engine time constant with increased accuracy, it may be beneficial to determine if the environmental factors affect the rate of cooling the engine differently than the rate of cooling of coupling 30. If so, a correction factor may be introduced into the coupling temperature estimate.

At the time of vehicle shutdown, control module 50 stores data including the calculated temperature of coupling 30, the engine coolant temperature and the ambient air temperature. When the vehicle ignition is switched on again, controller 50 reads the current engine coolant temperature and the ambient air temperature. Using the lumped thermal capacity model equation, the time the vehicle has been off may be calculated as follows:

$$t = \ln[(T-Te)/(To-Te)]*(-1)*(tc\_engine)$$

where
$tc\_engine$ = Engine time constant
$t$ = Time the vehicle has been off
$T$ = Current engine coolant temperature Te=Ambient air temperature at the time of ignition on Te_off=Ambient air temperature at ignition off, used for calculation validity To=Engine coolant temperature at the time of ignition shutoff As noted, ambient air temperature at ignition on, Te, is used for the vehicle time-off estimate. However, the ambient air temperature at ignition off, Te_off, will be stored and may be used for calculation plausibility. For example, a large change in ambient temperature between ignition-on and ignition-off but no change in engine coolant temperature may signify that one of the signals is faulty or that undefined conditions exist.

The time-off value, t, may then be substituted into the lumped thermal capacity model for coupling 30 to estimate its current temperature:

$$T_{TTD} = e(-t/tc) * (To_{TTD} - Te) + Te$$

where $T_{TTD}$=TTD current temperature $To_{TTD}$=Calculated TTD temperature at the time of vehicle shutoff Te=Ambient air temperature at the time of ignition on t=Time the vehicle has been off tc=TTD time constant A thermal model may also be defined for electric motor 122 of coupling 30. This model may be useful because the temperature of electric motor 122 may be higher than the temperature of the fluid in engagement with friction clutch 74. In certain modes of operation where the clutch is in a fully locked mode, electric motor 122 runs continuously while slip between friction plates 96 and 98 is minimal.

Figure 6:
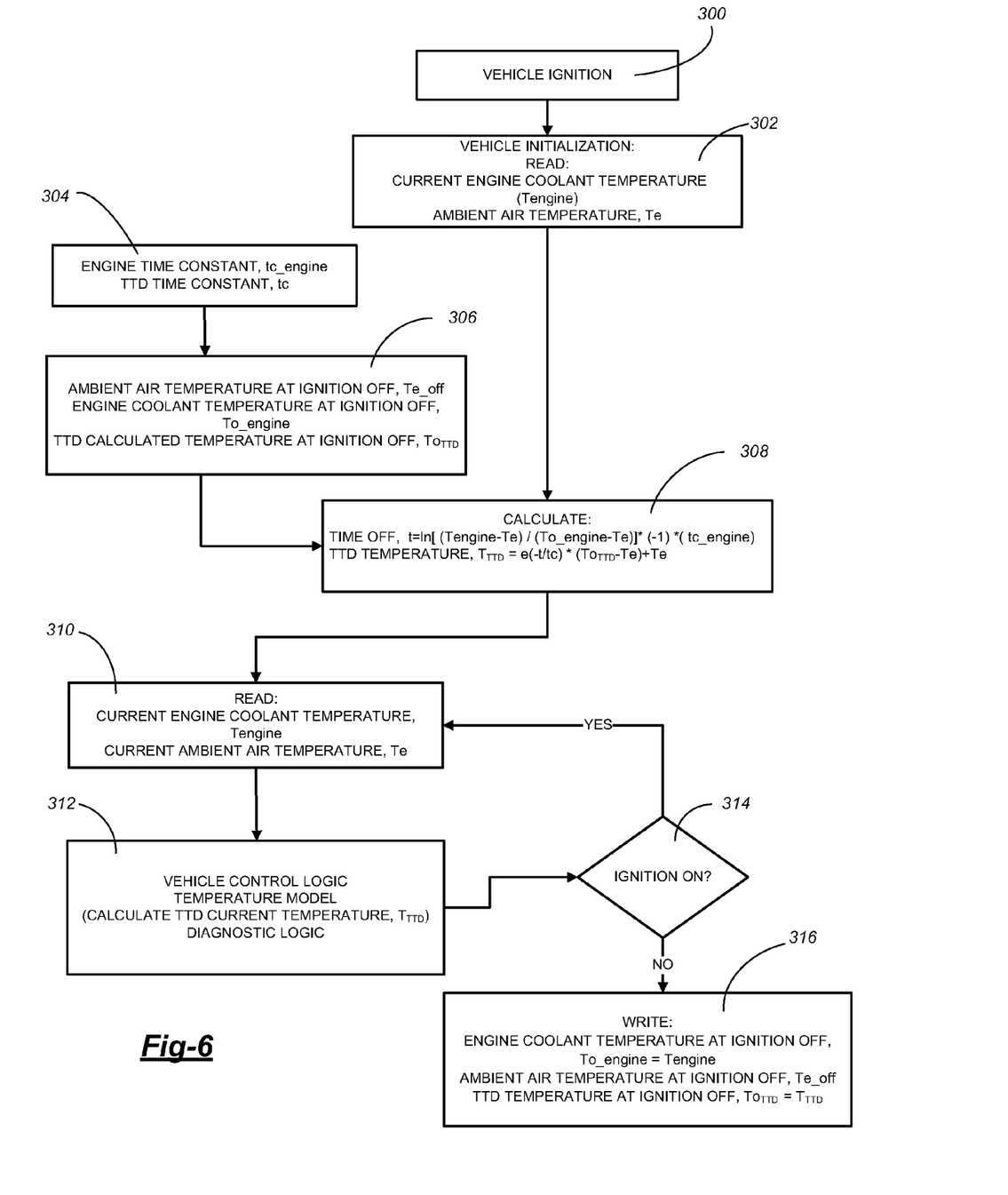
FIG. 6 is a flow diagram depicted a first method of estimating torque transfer device temperature.

FIG. 6 is a flow diagram depicting the first method to calculate the temperature of coupling 30 without the use of a temperature sensor associated directly with the torque transfer device. At block 300, the vehicle ignition is turned on thereby providing power to controller 50. Block 302 is associated with vehicle initialization where the current engine coolant temperature, Tengine, and ambient air temperature, Te, is read. Block 304 contains engine time constant, tc_engine, and a TTD constant, tc, that may be the same as engine time constant, tc-engine. TTD time constant, tc, may alternatively be independently determined in the same manner that the engine time constant was determined.

At block 306, previously measured or calculated data is stored from the last time the vehicle ignition was turned off. In particular, the ambient air temperature at ignition off is Te_off. The engine coolant temperature the last time the ignition was turned off is stored as To_engine. The last calculation of the TTD temperature is stored as $To_{TTD}$. At block 308, the time that the ignition has been turned off is calculated. Based on this calculation the TTD temperature is also calculated at block 308.

Block 310 reads the current engine coolant temperature, Tengine, from the vehicle bus. The current ambient air temperature, Te, is also determined by reading information available on the vehicle bus.

Block 312 provides the TTD temperature estimate to the vehicle control logic, the TTD temperature model and a vehicle diagnostic logic such that vehicle operation including the operation of coupling 10 may be controlled substantially continuously while the vehicle ignition is on. At block 314, it is determined whether the ignition remains on. If so, the current engine coolant temperature and the current ambient air temperature are read once again at block 310. At block 312 the vehicle control logic, temperature model and diagnostic logic systems are provided with the updated information to control the vehicle and coupling operation. If the ignition is off, block 316 is invoked where engine coolant temperature at ignition off, ambient air temperature at ignition off and TTD temperature at ignition off data are updated and written to memory.

Figure 7:
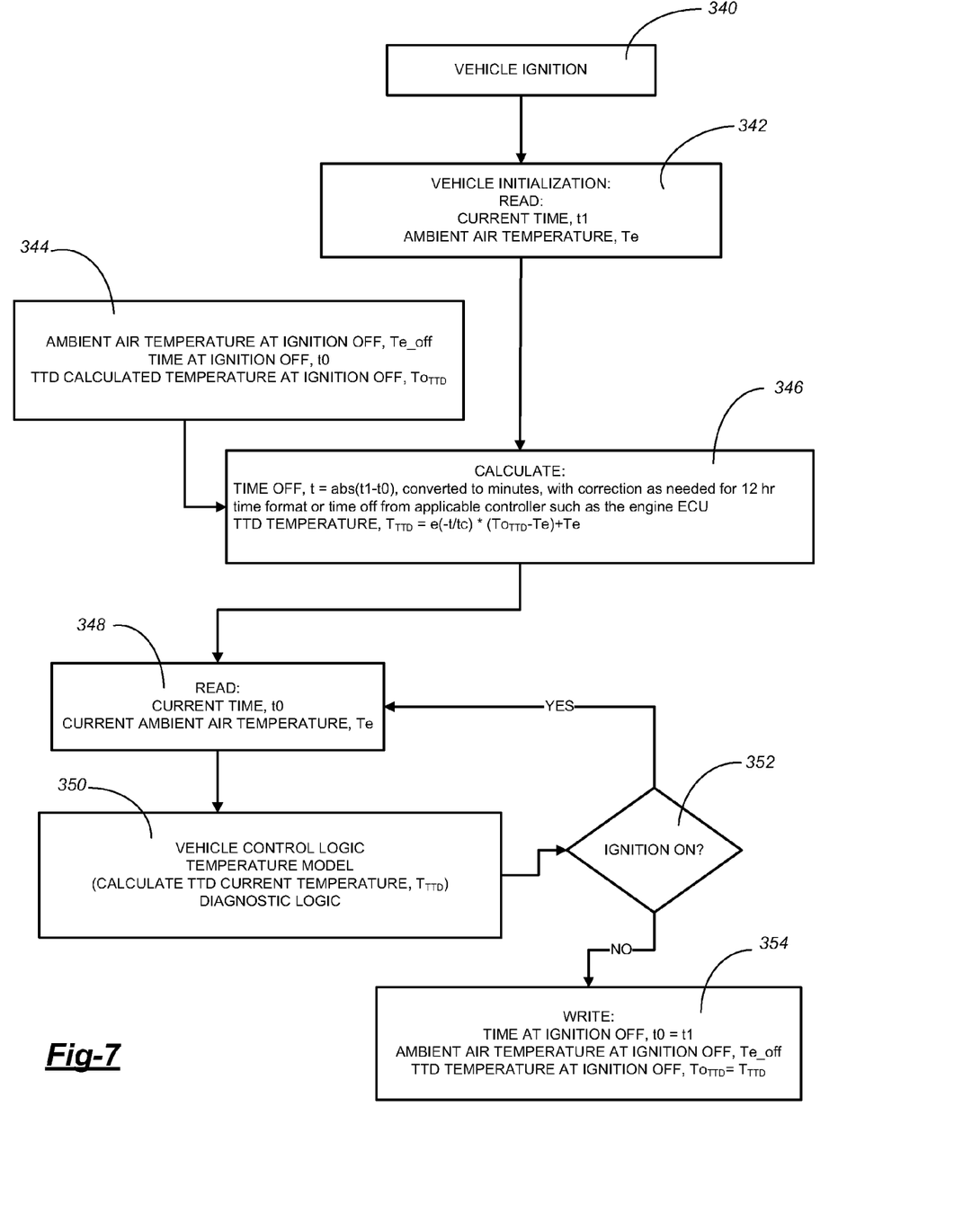
FIG. 7 is a flow diagram depicting a second method of estimating torque transfer device temperature.

A second method for determining the temperature of coupling 30 without the use of a directly mounted temperature sensor is also contemplated. The second method requires controller 50 to have access to data relating to the time of day. This data may be available over the vehicle communication bus, may be provided by the vehicle clock, or available by another means such as a global positioning system. The engine off time may also be provided by the vehicle engine controller or another source. The time of day at vehicle shutoff is stored. The time of day when the vehicle is started is read. The difference in time is substituted into the lumped thermal capacity model previously described to calculate the temperature of coupling 30. In particular, the lumped thermal capacity model provides:

$$T_{TTD} = e(-t/tc) * (To_{TTD} - Te) + Te$$

where t=Time at vehicle shutdown–time at vehicle start $T_{TTD}$=TTD current temperature $To_{TTD}$=Calculated TTD temperature at the time of vehicle shutoff Te=Ambient air temperature tc=TTD time constant FIG. 7 is a flow diagram depicting the second method to calculate the temperature of the TTD. At block 340, the vehicle ignition is turned on. At block 342 the vehicle is initialized where the current time and the ambient air temperature are read from the vehicle communication bus, the vehicle clock or any other means applicable. At block 344, previously stored data relating to ambient air temperature at ignition off, Te_off, time at ignition off, t0 and the TTD calculated temperature at ignition off, $To_{TTD}$ are read by controller 50. At block 346, the time that ignition has been off is calculated by subtracting the time at ignition off from the current time or using a value from an applicable controller such as engine off time. The time is converted to a minutes unit of measure and corrected as needed if the time data was provided with a 12 hour format. The TTD temperature is calculated based on the time that the ignition was off. At block 348, the current time is read. The current ambient air temperature is also read. At block 350, the vehicle control logic, the temperature model and the vehicle diagnostic logic are provided the current time, the current ambient air temperature and the estimated TTD temperature. Each of these systems is substantially continuously updated as long as the ignition is on. At block 352, it is determined whether the ignition is on. If the ignition is on, the current time and current ambient air temperature are read again and provided to the vehicle control logic, temperature model and diagnostic logic. If the ignition is off, at the time at ignition off, the ambient air temperature at ignition off and the TTD temperature at ignition off are written to memory at block 354.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without department from the spirit and scope of the disclosure as defined in the following claims.

What is claimed is:

1. A power transmission device comprising:
   a rotatable input member;
   a rotatable output member;

a friction clutch operable to selectively transfer torque between the input member and the output member;

an actuator operable to provide an actuating force to the friction clutch, the actuator including an electric motor having an output shaft drivingly coupled to a pump, the pump supplying pressurized fluid to a closed volume containing a piston acting on the friction clutch; and a controller estimating a temperature of the friction clutch at a time of the controller being switched on based on a time that the controller has been off.

2. The power transmission device of claim 1 wherein the controller temperature estimate after switching on is further based on a temperature of the power transmission device when the controller was previously shut off and the ambient air temperature.

3. The power transmission device of claim 1 wherein the controller estimates the time that the controller has been off based on a temperature of an engine coolant when the controller was previously shut off, a coolant temperature after the controller is switched back on and an ambient air temperature at an ignition on condition.

4. The power transmission device of claim 3 wherein the controller estimates the time that the controller has been off further based on an empirically determined engine time constant.

5. The power transmission device of claim 4 wherein determining the engine time constant includes operating an engine at a steady state temperature, shutting off the engine and measuring the time required for the engine to cool to 36.8 percent of the temperature difference between the steady state temperature and an ambient temperature.

6. The power transmission device of claim 1 wherein the pump includes a gerotor.

7. The power transmission device of claim 1 wherein the controller is adapted to access data representative of the time the controller has been off from a vehicle communication bus.

8. A vehicle comprising:
an engine;
a first driveline including a first set of wheels and being driven by the engine;
a second driveline including a second set of wheels; and
a power transmission device operable to selectively transfer torque between the first and second drivelines, the power transmission device including:
a rotatable input member;
a rotatable output member;
a friction clutch operable to selectively transfer torque between the input member and the output member;
an actuator operable to provide an actuating force to the friction clutch, the actuator including an electric motor coupled to a pump, the pump having an output in communication with a piston acting on the friction clutch; and
a controller estimating a temperature of the friction clutch at a time of the controller being switched on based on a time that the controller has been off.

9. The vehicle of claim 8 wherein the controller is operable to determine a desired torque split between the first and second sets of wheels, the controller being operable to control the motor to operate the pump and cause the friction clutch to transfer a magnitude of torque to meet the desired torque split.

10. The vehicle of claim 8 wherein the power transmission device includes a housing spaced apart from all other power transmission devices having gears.

11. The vehicle of claim 8 wherein the piston is positioned within a closed volume and the pump outputs pressurized fluid to the closed volume.

12. The vehicle of claim 8 wherein the controller temperature estimate after switching on is further based on a temperature of the power transmission device when the controller was previously shut off and an ambient air temperature at an ignition on condition.

13. The vehicle of claim 8 wherein the controller estimates the time that the controller has been off based on a temperature of an engine coolant when the controller was previously shut off, a coolant temperature after the controller is switched back on, and an ambient air temperature at an ignition on condition.

14. The vehicle of claim 13 wherein the controller estimates the time that the controller has been off based on an empirically determined engine time constant.

15. The vehicle of claim 14 wherein determining the engine time constant includes operating the engine at a steady state temperature, shutting off the engine and measuring the time required for the engine to cool to 36.8 percent of the temperature difference between the steady state temperature and an ambient temperature.

16. The vehicle of claim 8 wherein the controller is adapted to access data representative of the time the controller has been off from a vehicle communication bus.

17. A power transmission device for use in a vehicle having an engine, the power transmission device comprising:
a rotatable input member;
a rotatable output member;
a friction clutch operable to selectively transfer torque between the input member and the output member;
an actuator operable to generate and apply an actuating force to the friction clutch, the actuator including an electric motor driving a pump, the pump supplying pressurized fluid to a closed volume containing a piston acting on the friction clutch; and
a controller estimating a temperature of the friction clutch at a time of the controller being switched on based on a time that the controller has been off, wherein the controller is operable to estimate the time that the controller has been off based on a temperature of an engine coolant when the controller was previously shut off, a coolant temperature after the controller is switched back on, and an ambient air temperature at an ignition on condition, and wherein the controller is further operable to estimate the time that the controller has been off based on an empirically determined engine time constant.

18. The power transmission device of claim 17 wherein determining the engine time constant includes operating the engine at a steady state temperature, shutting off the engine and measuring the time required for the engine to cool to a predetermined percent of the temperature difference between the steady state temperature and an ambient temperature.

* * * * *